United States Patent [19]

Pioch

[11] 4,312,421
[45] Jan. 26, 1982

[54] SOUND ABSORPTION FOR A LAWNMOWER

[75] Inventor: Peter P. Pioch, Idstein, Fed. Rep. of Germany

[73] Assignee: Black & Decker Inc., Newark, Del.

[21] Appl. No.: 119,558

[22] Filed: Feb. 7, 1980

[30] Foreign Application Priority Data

Jan. 29, 1980 [EP] European Pat. Off. ............ 80100453

[51] Int. Cl.³ ........................ H02K 5/24; A01D 67/00
[52] U.S. Cl. ..................................... 181/202; 56/320.1
[58] Field of Search .............................. 181/198–205, 181/DIG. 1; 123/198 E; 352/35; 56/17.5, 320.1, 320.2

[56] References Cited

U.S. PATENT DOCUMENTS 4,194,345  3/1980  Pioch et al. ........................... 56/17.5

FOREIGN PATENT DOCUMENTS 1507303  1/1970  Fed. Rep. of Germany ....... 56/17.5
2024591  1/1980  United Kingdom ............... 56/320.1

OTHER PUBLICATIONS

Antonetti et al., "Accoustic Housing for Blowers", IBM Technical Bulletin, vol. 14, No. 9, Feb. 1972.

Primary Examiner—L. T. Hix
Assistant Examiner—Thomas H. Tarcza
Attorney, Agent, or Firm—Walter Ottesen; Leonard Bloom; Edward D. Murphy

[57] ABSTRACT

This disclosure relates to a sound absorbing arrangement for a power lawnmower in which sound absorbing material is provided within the body of the lawnmower to reduce noise by attenuating resonance caused by the lawnmower motor. In addition to reducing noise, the sound absorbing material imparts structural rigidity to the lawnmower body or housing, and also may be used to define air passages within the lawnmower body for use in cooling the motor.

8 Claims, 2 Drawing Figures

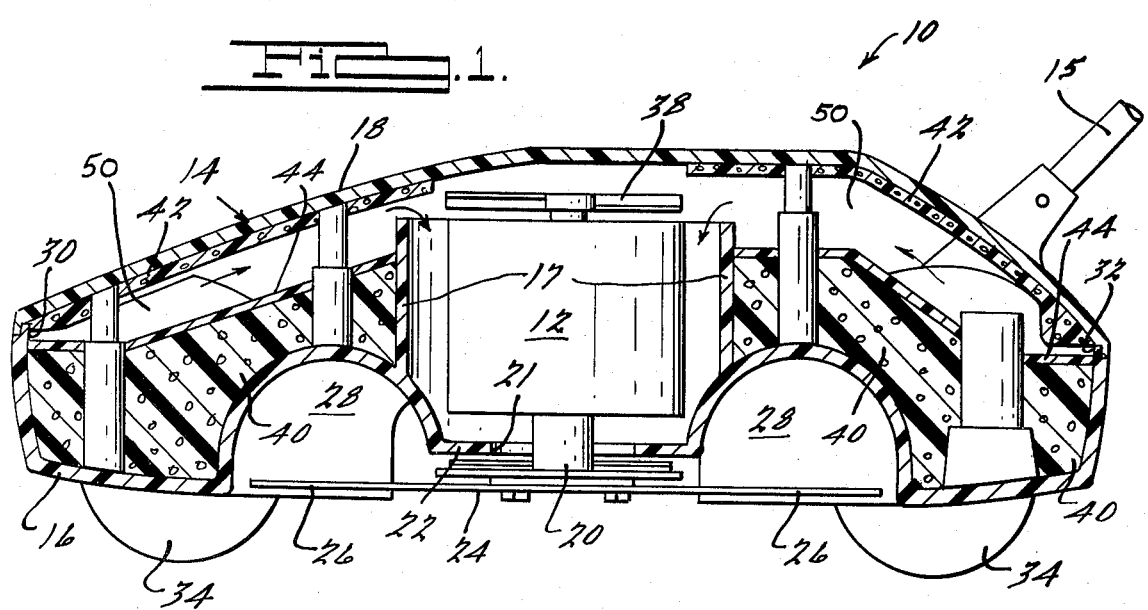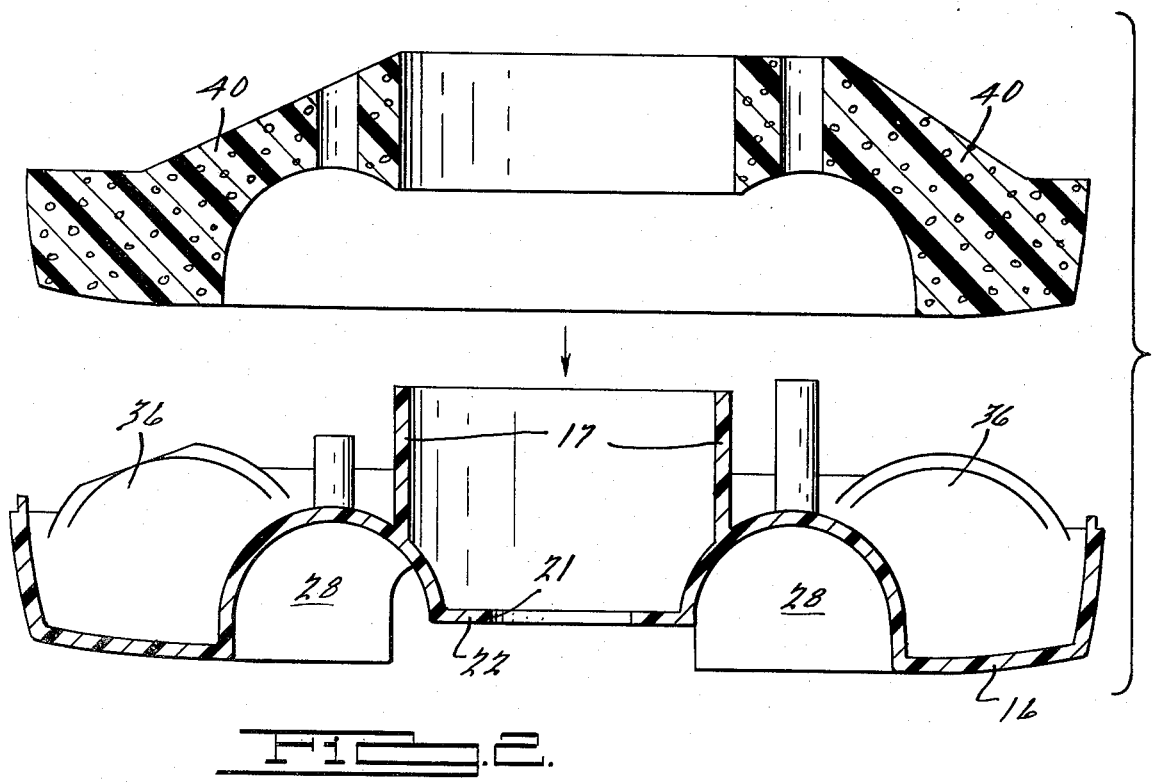

SOUND ABSORPTION FOR A LAWNMOWER

BACKGROUND AND SUMMARY OF THE INVENTION

The present invention pertains primarily to lawnmowers, and more particularly to power lawnmowers.

It is generally well known that power lawnmowers produce a noticeable and very often an annoying amount of noise during their operation. Although gas-powered lawnmower motors normally produce more noise than electric lawnmower motors, both generate sufficient resonance and resulting noise to induce lawnmowers manufacturers to consider reasonable noise levels as one of the many requirements during design of a new lawnmower. Some European countries, such as West Germany, have laws regulating the noise levels of lawnmowers, and actually restrict the use of those mowers that do not meet strict db levels to specified periods of the day.

One approach at reducing the noise problem has been to use motors which generate less noise. However, this normally results in the use of a smaller less powerful motor. In any attempt at reducing noise problems, therefore, special consideration should be given to maintaining sufficient power levels to enable efficient operation, as well as accommodating the other necessary criteria of lawnmower operation, including cooling of the motor by circulating air, and maintaining the relatively low profile and manuverability of the lawnmower.

Accordingly, it is a principal object of the present invention to provide sound absorption for a power lawnmower which in addition to reducing noise levels, enables the production of a lawnmower without drastic modifications to the design, operation, size, or weight of the mower, while at the same time actually increasing the structural integrity of the lawnmower body.

In general, the sound absorption arrangement for power mowers according to the present invention contemplates the use of rigid sound absorbing material that is configured to conform to the interior volume between the motor and the mower housing. The material thus serves to not only attenuate the noise generated by the motor but also serves to add structural support to the mower housing. In addition, the sound absorbing sub-assembly is preferably adhered to the interior surfaces of the housing to dampen the resonances of the lawnmower body caused by vibration transmitted from the mower. Moreover, in the preferred embodiment of the present invention the sound absorbing material is also used to define air passages within the mower housing for directing the flow of cooling air through the body around the motor.

Additional advantages and features of the present invention will become apparent from a reading of the detailed description of the preferred embodiment which makes reference to the following set of drawings in which:

BRIEF DESCRIPTION OF THE DRAWINGS

FIG. 1 is an elevation view, partially in section, of the lawnmower sound absorbing arrangement of the present invention; and FIG. 2 is a sectional elevation view of the present invention showing a preformed sound absorbing material insert ready for installation in a mating lower body portion of a lawnmower assembly.

DETAILED DESCRIPTION OF THE PREFERRED EMBODIMENT

Referring to FIG. 1, a lawnmower incorporating the sound absorbing arrangement of the present invention is shown. The lawnmower 10 illustrated in the preferred embodiment is of the general type described in copending U.S. application Ser. No. 915,627, filed June 14, 1978, entitled "Lawnmower" now U.S. Pat. No. 4,194,345, and assigned to the assignee of the present invention. However, it is to be understood that the present invention is applicable to other enclosed power mower configurations. The lawnmower 10 generally comprises an electric motor 12 disposed within a two-part housing 14 which carries and fully encloses the motor 12. The housing 14 includes a lower body portion 16 which supports the motor 12 and serves as the chassis for the lawnmower 10 and an upper body portion or cover 18 which mates with the lower body portion 16 to jointly define an enclosed housing for the motor 12. The rearward portion of the cover 18 also supports the handle 15 of the mower which is removably secured thereto. The chassis portion 16 has an upwardly extending integral side wall 17 which supports the motor 12 in a vertical orientation so that the shaft 20 of motor 12 extends downwardly through an opening 21 in the bottom wall 22 of chassis 16. A conventional rotary cutting blade 24 is secured to the exposed end of motor shaft 20.

To facilitate the flow and discharge of grass clippings the outer cutting portions 26 of blade 24 are rotatable within a semitoroidal-shaped recessed passage 28 formed in the bottom wall 22 of chassis 16 concentric with motor shaft 20. The upwardly curved passage 28 serves to channel the air currents generated by the mower blade 24 to the discharge port. The chassis portion 16 of the body 14 also has formed therein chambers 37 (FIG. 2) which open downwardly for receiving therein the wheels 34 of the mower 10. In this manner, the wheels are disposed within the housing 14 to thus permit the mower 10 to cut closely to walls and trees.

Referring now to FIG. 2, a disassembled view of lower chassis portion 6 and the body of sound absorbing material 40 according to the present invention is shown. In the embodiment illustrated herein, the sound absorbing material comprises a single preformed body 40 molded to conform to the various interior surface contours of chassis portion 16. Hence, when positioned within chassis 16, the body of sound absorbing material 40 will completely occupy the interior region of housing 14 between the side wall 17 supporting the motor 12 and the front and rear walls of the housing. In this manner, the noise generated by the motor 12 will be substantially attenuated by the surrounding body of sound absorbing material 40 before passing through the walls of the housing 14. Additionally, the body of sound absorbing material 40 is preferably adhered to the interior surfaces of the chassis portion 16 when installed to deaden the resonance normally produced by the body 14 of the mower 10 as a result of vibration transmitted from the motor 12. To further attenuate the noise generated by the motor 12, the present invention also contemplates the use of an additional layer of sound absorbing material 42 which is attached to the interior surface of cover 18 as shown in FIG. 1. This, of course, serves to reduce the level of noise that is transmitted through the cover 18 of the housing 14.

Significantly, despite the presence of the mass of sound absorbing material 40 surrounding the motor 12, the sound absorbing arrangement of the present invention does not create a heat dissipation problem for the mower 10. In particular, the body of sound absorbing material 40 is designed so that when installed in chassis 16, its upper surface defines air passages for channeling the air drawn into the housing 14 by motor fan 38 through the air inlet ports 30 and 32 located in the front and rear walls, respectively, of housing 14, around the body of the motor 12. Thus, as indicated by the arrows in FIG. 1, ambient air drawn through inlet ports 30 and 32 is directed between insulating layers 40 and 42 and downward through the air jacket defined by vertical side wall 17 surrounding the motor 12.

The sound absorbing material 40 in the preferred embodiment of the present invention is comprised of a rigid, lightweight polymeric foam such as polyurethane or polystyrene foam. Of course, such factors as the operating environment and whether an electric or gas-powered motor is used, will have an effect on the choice of materials. In addition, as illustrated in FIG. 1, the body of sound absorbing material 40 is preferably covered with a layer of foil 44 or the like to act as a seal to keep moisture, dust and other contaminants which may enter the housing with the cooling air through inlet ports 30 and 32, away from the sound absorbing material 40.

Alternatively, the insulating or sound absorbing material 40 of the present invention may comprise a polymeric foam such as polyurethane which is "foamed in place"; that is, reacted and allowed to form into a rigid foam mass directly in the appropriate regions of the lawnmower housing 14. The reacting foam mixture would adhere to the interior surfaces of the housing 14 and could be allowed to expand to the shape of the preformed mass shown in FIG. 2, by simply positioning the foil layer 44 prior to injecting the reacting mixture. A thin layer of reacting mixture could also be applied to the underside of the upper wall 40 with the amount of expansion being controlled by the amount of material applied, the amount of blowing agent, reaction and surface temperatures, etc.

Thus, it will be appreciated from the above description that the sound absorbing arrangement of the present invention enables the production of a lawnmower which in addition to emitting substantially reduced noise levels with conventional motors, can allow the use of larger, more powerful motors while still meeting reasonable noise standards. Since the sound absorbing material also serves to enhance the structural rigidity of the lawnmower body, the thickness and thus the cost of the lawnmower body walls may be reduced.

While the above description constitutes the preferred embodiment of the present invention, it will be appreciated that the invention is susceptible to modification, variation and change without departing from the power scope or fair meaning of the accompanying claims.

What is claimed is:

1. In a power lawnmower comprising a motor and a housing substantially enclosing the motor, the improvement comprising:
a body of rigid sound absorbing material configured to substantially completely occupy the interior volume of said housing between the motor and the walls of said housing so as to reduce the noise level of said lawnmower while providing additional structural support for said housing.

2. The lawnmower of claim 1 wherein said body of sound absorbing material is adhered to the interior surfaces of said housing to dampen the resonances produced by said lawnmower.

3. The lawnmower of claim 1 wherein the walls of said housing contain air inlet ports and said motor includes means for drawing ambient air through said inlet ports; said body of sound absorbing material being further configured so as to define passages for channeling air drawn through said inlet ports around said motor.

4. The lawnmower of claim 3 further including a layer of foil for covering the surface of said body of sound absorbing material defining said air passages.

5. In a power lawnmower including an electric motor and a two-piece housing substantially enclosing said motor and comprising a lower chassis portion having mounted thereto said motor and a cover portion adapted to be fitted over said chassis portion, the improvement comprising: a body of rigid sound absorbing material configured to conform to the interior surface contours of said chassis portion such that when properly positioned within said chassis said body of sound absorbing material substantially completely occupies the interior volume of said chassis between said motor and the front and rear walls of said chassis, said body of sound absorbing material being adhered to the interior surfaces of said chassis and providing additional structural support for said housing.

6. The lawnmower of claim 5 wherein the walls of said housing contain air inlet ports and said motor includes means for drawing ambient air through said inlet ports; said body of sound absorbing material being further configured so as to define passages for channeling air drawn through said inlet ports around said motor.

7. In a power lawnmower including a motor and a housing substantially enclosing said motor, wherein said housing has air inlets and said motor includes means for drawing ambient air through said air inlets, the improvement comprising:
a body of rigid sound absorbing material configured to mate with the interior contours of said housing so that said body of sound absorbing material substantially completely occupies the interior volume of said housing to thereby provide structural support for said housing, said body of sound absorbing material being adhered to said housing and being further configured to define passages for directing cooling air drawn through said air inlets around said motor.

8. The lawnmower of claim 7 further including a layer of foil for covering the surface of said body of sound absorbing material defining said passages.

* * * * *